(12) United States Patent
Narayanan et al.

(10) Patent No.: US 10,318,550 B2
(45) Date of Patent: *Jun. 11, 2019

(54) SYSTEMS AND METHODS FOR AUTONOMOUS RESOURCE DISCOVERY, MANAGEMENT, AND STITCHING

(71) Applicant: DELL PRODUCTS L.P., Round Rock, TX (US)

(72) Inventors: Rajesh Narayanan, San Jose, CA (US); Viswanath Ponnuru, Bangalore (IN); Krishnaprasad Koladi, Bangalore (IN); Ke Xu, Vacaville, CA (US)

(73) Assignee: DELL PRODUCTS LP, Round Rock, TX (US)

(*) Notice: Subject to any disclaimer, the term of this patent is extended or adjusted under 35 U.S.C. 154(b) by 950 days.

This patent is subject to a terminal disclaimer.

(21) Appl. No.: 14/808,925

(22) Filed: Jul. 24, 2015

(65) Prior Publication Data
US 2017/0026306 A1     Jan. 26, 2017

Related U.S. Application Data

(63) Continuation of application No. 14/806,638, filed on Jul. 22, 2015, now Pat. No. 10,146,848.

(51) Int. Cl.
*G06F 17/30*    (2006.01)
*G06F 16/27*    (2019.01)
(Continued)

(52) U.S. Cl.
CPC ........ *G06F 16/275* (2019.01); *G06F 16/2228* (2019.01); *G06F 16/27* (2019.01);
(Continued)

(58) Field of Classification Search
CPC ...................................................... H04L 41/12
(Continued)

(56) References Cited

U.S. PATENT DOCUMENTS

2002/0002563 A1    1/2002   Bendik
2002/0139839 A1   10/2002   Catan
(Continued)

OTHER PUBLICATIONS

Non-Final Office Action dated Jul. 13, 2017, in related U.S. Appl. No. 14/806,638 (13 pgs).
(Continued)

*Primary Examiner* — Baoquoc N To
(74) *Attorney, Agent, or Firm* — North Weber & Baugh LLP

(57) ABSTRACT

The present invention relates generally to management in an autonomous, distributed environment. Aspects of the present invention include employing a distributed, scalable, autonomous resource discovery, management, and stitching system. In embodiments of the present invention a block architecture can be used where each block maintains management of the block rather than the entire environment. In embodiments of the present invention each block includes an autonomous resource discovery, management, and stitching system capable of communicating with autonomous resource discovery, management, and stitching, systems of other blocks to allocate and share resources between blocks.

18 Claims, 11 Drawing Sheets

(51) Int. Cl.
*G06F 16/22* (2019.01)
*H04L 12/911* (2013.01)
*H04L 12/933* (2013.01)
*H04L 29/08* (2006.01)

(52) U.S. Cl.
CPC .. *G06F 17/30283* (2013.01); *G06F 17/30321* (2013.01); *G06F 17/30581* (2013.01); *H04L 47/70* (2013.01); *H04L 49/15* (2013.01); *H04L 67/16* (2013.01)

(58) Field of Classification Search
USPC .................. 707/704, 769, E17.014; 709/226
See application file for complete search history.

(56) References Cited

U.S. PATENT DOCUMENTS

| | | | |
|---|---|---|---|
| 2005/0049841 A1 | 3/2005 | Chen | |
| 2008/0245860 A1 | 10/2008 | Polano | |
| 2010/0153557 A1* | 6/2010 | Park | H04L 67/2819 |
| | | | 709/226 |
| 2012/0036262 A1* | 2/2012 | Murphy | H04N 21/43615 |
| | | | 709/225 |
| 2013/0151558 A1 | 6/2013 | Chercoles Sanchez | |
| 2015/0334177 A1 | 11/2015 | Szalay | |

OTHER PUBLICATIONS

Response filed Oct. 13, 2017, in related U.S. Appl. No. 14/806,638 (11 pgs).
Final Office Action dated Jan. 24, 2018, in related U.S. Appl. No. 14/806,638 (13 pgs).
Response filed Mar. 16, 2018, in related U.S. Appl. No. 14/806,638 (11 pgs).
Wikipedia, "Dynamic Source Routing," [online], [retrieved Feb. 17, 2016]. Retrieved from Internet <URL: https://en.wikipedia.org/wiki/Dynamic_Source_Routing> (3 pages).
Notice of Allowance and Fee Due, dated Aug. 14, 2018, in related U.S. Appl. No. 14/806,638 (7 pgs).
Notice of Allowance and Fee Due, dated Apr. 30, 2018, in related U.S. Appl. No. 14/806,638 (8 pgs).

* cited by examiner

SYSTEMS AND METHODS FOR AUTONOMOUS RESOURCE DISCOVERY, MANAGEMENT, AND STITCHING

CROSS-REFERENCE TO RELATED APPLICATIONS

This application is a continuation of copending and commonly owned application Ser. No. 14/806,638, filed Jul. 22, 2015, titled, "SYSTEMS AND METHODS FOR AUTONOMOUS, SCALABLE, AND DISTRIBUTED DATABASE MANAGEMENT, and naming as inventors, Rajesh Narayanan, YuLing Chen, and Ke Xu, which application is hereby incorporated herein by reference in its entirety.

BACKGROUND

Field of Invention

The present invention relates generally to data networks and devices, and relates more particularly to scalable and autonomous resource discovery, management, and stitching.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems provide increasingly more central and critical operations in modern society, it is important that the networks are reliable. One method used to improve reliability is to provide a centralized network management.

One type of information handing system is a large-scale datacenter or multiple cloud clusters. In a large-scale datacenter or multiple cloud clusters, control and management is a difficult task. Control and management includes resource discovery, reservation, monitoring, maintenance, teardown, etc. Centralized control of federation between different aggregate managers is a popular method, for example global environment for network innovations (GENI) deployment. However, such mechanism requires additional external infrastructure. This architecture is not able to scale infinitely due to the computing and access limitations of the control infrastructure. Furthermore, cloud infrastructure, e.g., OpenStack, itself does not address and solve this scalability issue when controlling thousands of nodes in a data center.

FIG. 1 depicts a block diagram of centralized management structure according to prior art embodiments. FIG. 1 shows a datacenter or cloud infrastructure 120 including a plurality of racks 130, 140, 150, 160, 170, 180, and 190. Within this infrastructure there can be a plurality of customers, for example, as shown in FIG. 1, customer 1 192 and customer 2 194. Each customer 192 and 194 can rent space in the data center. For example, customer 1 192 can rent infrastructure 174 and infrastructure 182 and customer 2 194 can rent infrastructure 172 and 184. In the prior art system shown in FIG. 1 a central management 110 is used. Central management performs all the monitoring, resource discovery, resource allocation, maintenance, etc. in the entire datacenter structure 120 including all racks 130, 140, 150, 160, 170, 180, and 190. Having a central management 110 is limiting in the sense that there is a finite, fixed number of racks that can be added to a central management 110. Therefore, the central management system has inherent scalability and manageability limitations.

Accordingly, what is needed is to solve this scalability issue, enabling extending from ten nodes to a million nodes.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

Figure 1:
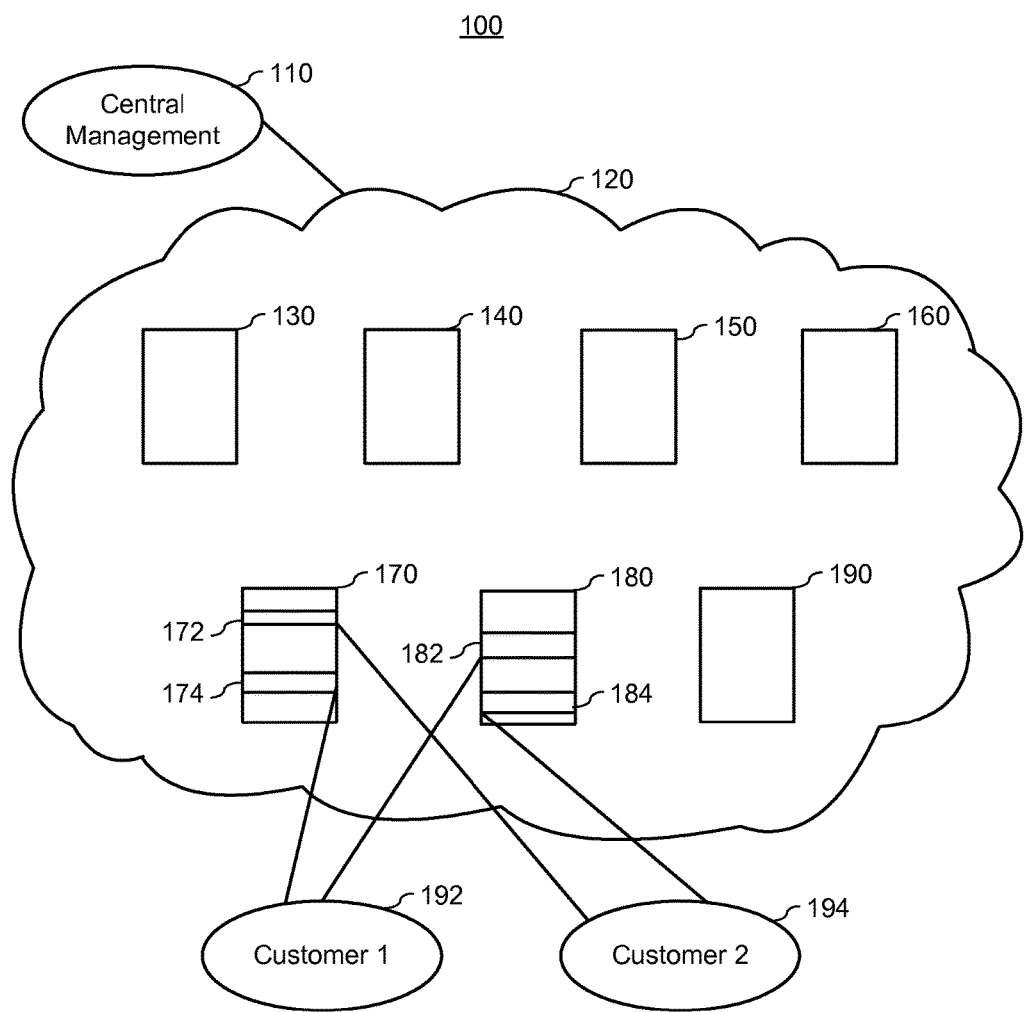
FIG. 1 depicts a block diagram of centralized management structure according to prior art embodiments.

In the following description, for purposes of explanation, specific examples and details are set forth in order to provide an understanding of the invention. It will be apparent, however, to one skilled in the art that the invention may be practiced without these details. Well known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in, among other advantages, the ability to manage networks at a datacenter or cloud infrastructure level.

It shall also be noted that although embodiments described herein may be within the context of management in a network device, the invention elements of the current patent document are not so limited. Accordingly, the invention elements may be applied or adapted for use in other contexts.

Figure 2:
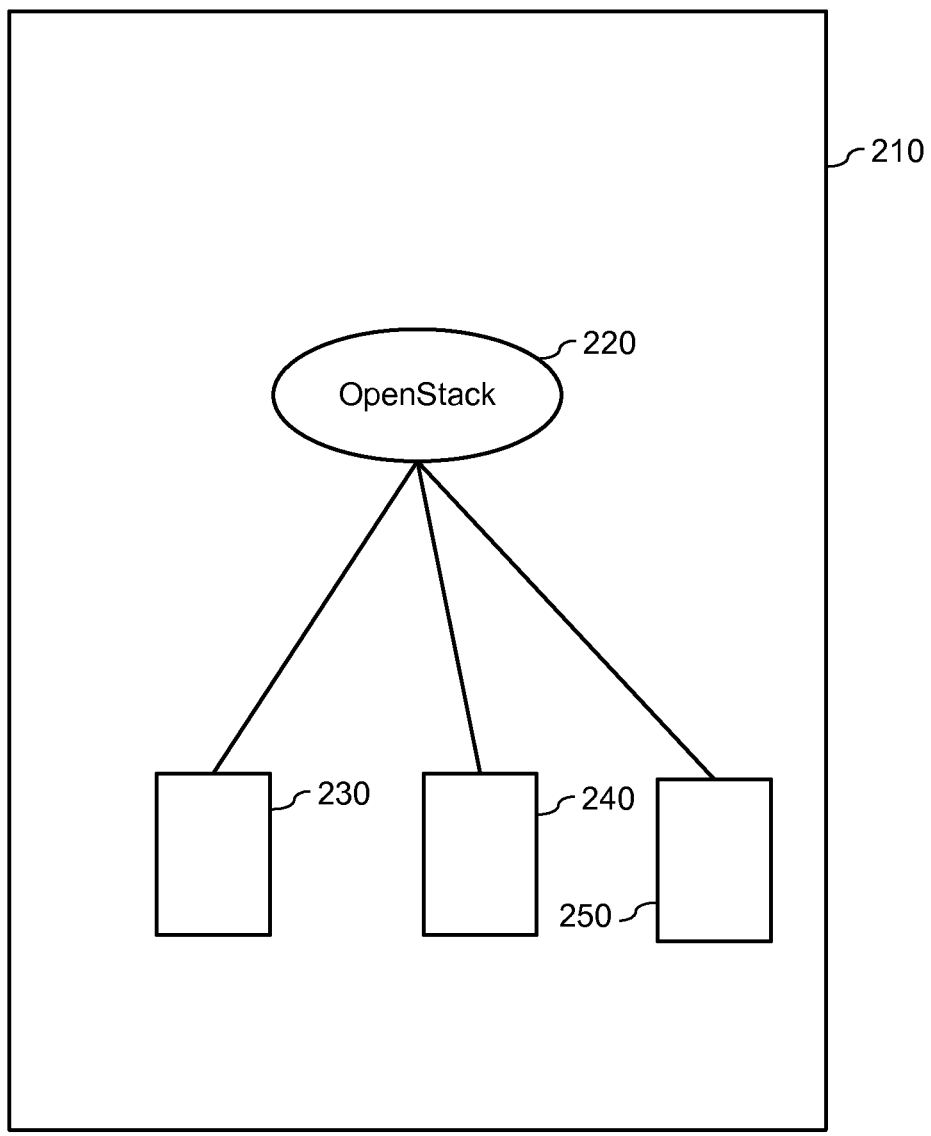
FIG. 2 depicts a block diagram of an embodiment of an OpenStack system according to embodiments of the present invention.

FIG. 2 depicts a block diagram of an embodiment of an OpenStack system according to embodiments of the present invention. FIG. 2 shows a block 210. Included in block 210 is an OpenStack management 220 managing a plurality of racks 230, 240, and 250. FIG. 2 is illustrated as a block for ease of explanation. However, embodiments of the present invention are not limited to blocks. Another embodiment of the present invention can use a set of distributed autonomous instances instead of blocks. Another embodiment of the present invention is an infrastructure cluster. The embodiment of the present invention can be a plugin that interfaces with the infrastructure controller via the controllers APIs. Also, FIG. 2 illustrates an OpenStack management system. However, any prior art management system can be used. In embodiments of the present invention, the block 210 can be replicated and linked together with each of the replicated blocks.

Figure 3:
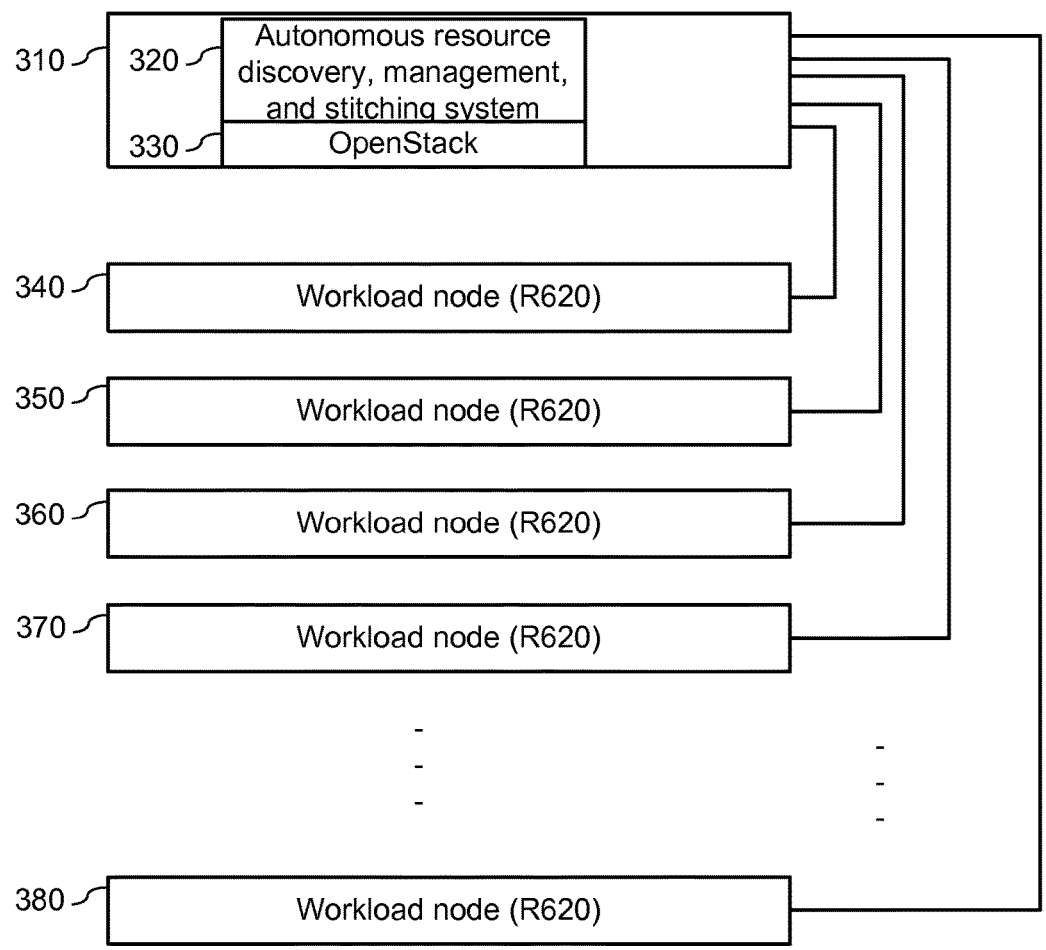
FIG. 3 depicts a block diagram of a block architecture according to embodiments of the present invention.

FIG. 3 depicts a block diagram of a block architecture according to embodiments of the present invention. FIG. 3 shows one example of the block physical architecture according to embodiments of the present invention. In this embodiment a block includes R720 310 with a NIC switch. A NIC switch Switch is a Network Interface Card (NIC) that includes a network switch ASIC built in. One example of a NIC switch is an Intel ALTA (a network switch embedded on a peripheral component interconnect express (PCIe)) card and R620 workload nodes 340, 350, 360, 370, and 380. OpenStack can be installed as the infrastructure of this block 300, in which case the server-switch 310 is the controller node and the workload nodes 340, 350, 360, 370, and 380 are compute nodes.

In embodiments of the present invention, autonomous resource discovery, management, and stitching system 320 can be software executing on the controller node (R720) 310, cooperating with OpenStack 330 to perform resource control and management. In embodiments of the present invention, a resource can include compute, storage, networking, file system, individual files, capabilities of devices, sensors, services, or any other resource. In embodiments of the present invention, internally, autonomous resource discovery, management, and stitching system 320 can retrieve information from OpenStack 330 and assign resources via OpenStack 330. In embodiments of the present invention, externally, autonomous resource discovery, management, and stitching system 320 can have the knowledge of all the interfaces on the controller node 310 and can communicate with other autonomous resource discovery, management, and stitching systems 320 of other blocks via these interfaces to share resource information. In embodiments of the present invention, a plurality of blocks 300 can be connected to each other. Thereby eliminating a central management and instead having a distributed management of the entire data structure or infrastructure through the autonomous resource discovery, management, and stitching systems. Using an autonomous, distributed management system, there are many advantages, including scalability since more blocks can be added to the system to increase the number of racks without limitation.

Figure 4:
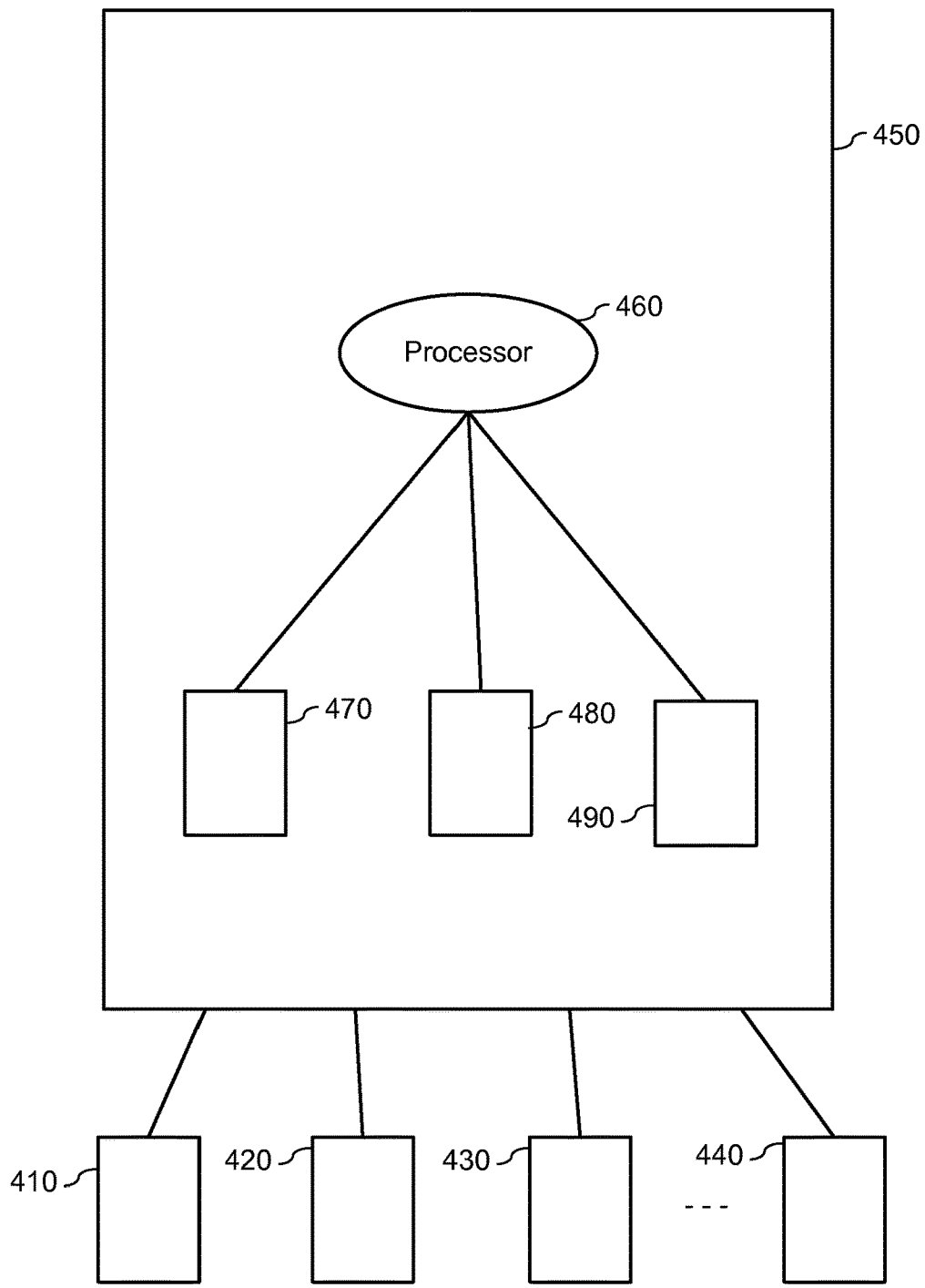
FIG. 4 depicts another block diagram of an architecture according to embodiments of the present invention.

FIG. 4 depicts another block diagram of an architecture according to embodiments of the present invention. FIG. 4 shows a block diagram of another embodiment of the present invention. In the embodiment shown in FIG. 4 a block implementation is not used. In the embodiment shown in FIG. 4 a block 450 including processor 460, and local infrastructures 470, 480, and 490 is used and is connected to further infrastructure 410, 420, 430, and 440. In the embodiment show in FIG. 4 each infrastructure can maintain its own management. Similar to the block architecture, the management is distributed rather than central.

A block 450 can include a processor 460 and any type of local infrastructures 470, 480, and 490. In one embodiment the processor 460 can reside on a switch or a server. In another embodiment, the processor 460 can reside in a storage system. In another embodiment, the processor 460 can reside in a thermostat. Processor 460 can be any processor capable of implementing an autonomous, distributed management system in any environment, e.g., a compute environment, a storage environment, or a networking environment.

Infrastructure 470, 480, and 490 can be any type of infrastructure. For example, infrastructure 470, 480, and 490 can be racks used in a server environment, memory or storage space, or any other infrastructure that can be implemented in a distributed management system in any environment, e.g., a compute environment, a storage environment, or a networking environment.

Figure 5:
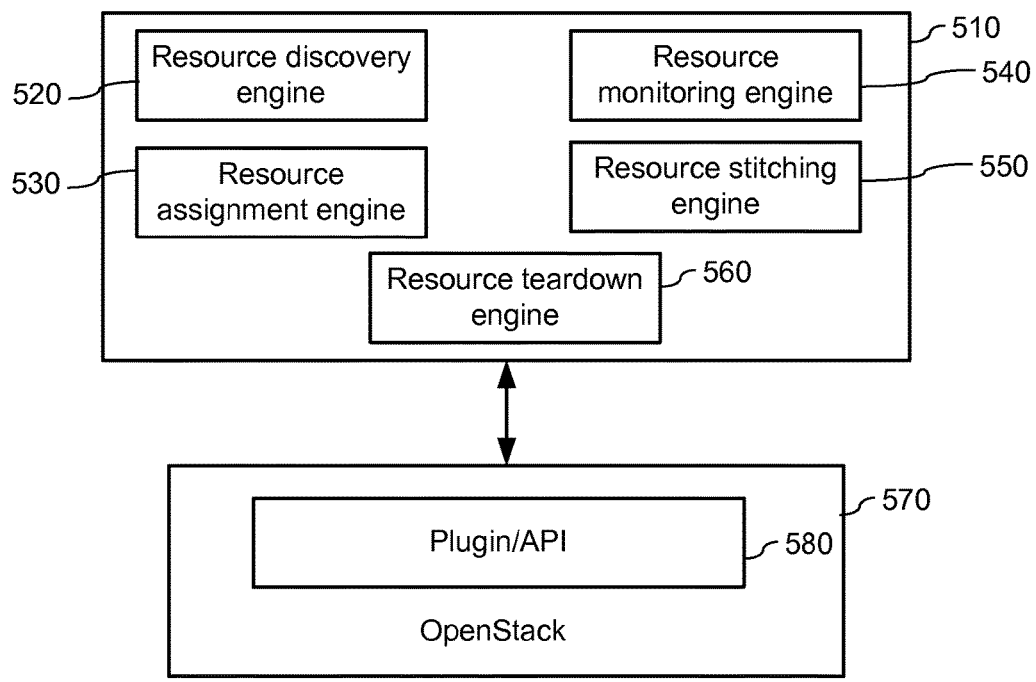
FIG. 5 depicts a block diagram of components of autonomous resource discovery, management, and stitching system according to embodiments of the present invention.

FIG. 5 depicts a block diagram of components of autonomous resource discovery, management, and stitching system according to embodiments of the present invention. FIG. 5 shows autonomous resource discovery, management, and stitching system 500 depicted in FIG. 3 as autonomous resource discovery, management, and stitching system 320 including autonomous resource discovery, management, and stitching system 510 and OpenStack 570. Autonomous resource discovery, management, and stitching system 510 includes resource discovery engine 520, resource assignment engine 530, resource monitoring engine 540, resource stitching engine 550, and resource teardown engine 560. Autonomous resource discovery, management, and stitching system 510 can execute on a switch in a data center. In embodiments of the present invention, a resource can be any computing, networking, or storage assigned and used via OpenStack. One of ordinary skill in the art will appreciate that OpenStack is used by way of example and not limitation. One of ordinary skill in the art will appreciate that what is shown as OpenStack in FIG. 5 and the description of FIG. 5 can be a VMWare based cloud, Microsoft Azure or any cloud framework. For ease of explanation, OpenStack will be used herein to refer to any cloud framework.

One advantage of using autonomous resource discovery, management, and stitching system 510 is its ability to seek out resources in a heterogeneous cloud, where there are multiple blocks that can have different cloud management software. Autonomous resource discovery, management, and stitching system 510 can communicate with OpenStack 570 via plugins and application program interfaces (APIs) 580.

Resource discovery engine 520 can used by autonomous resource discovery, management, and stitching system 510 to find resources. When autonomous resource discovery, management, and stitching system 510 receives a resource request from a user or an application, autonomous resource discovery, management, and stitching system 510 first checks the local block to see if there exist any available resources requested. If the local block's resources can meet the requirements of the request, then the discovery process ends and autonomous resource discovery, management, and stitching system 510 proceeds with resource assignment as in the case of central management. If no available resources or insufficient resources are at the local block, autonomous resource discovery, management, and stitching system 510 sends out discovery messages over at least one available interface to seek requested resources from other blocks. When another autonomous resource discovery, management, and stitching system 510 receives an incoming discovery message, it can either forward it or reply to it depending on if there are available resources in its block satisfying the request included in the message. A reply can contain information of assigned resources and stitching. A discovery message can either have a timeout value or hop limit value. This timeout or hop limit allows unnecessary broadcast storms, or a distributed denial of service (DDoS) like reply back to the requesting autonomous resource discovery, management, and stitching system 510.

If a block has available resources satisfying a request, autonomous resource discovery, management, and stitching system 510 uses a resource assignment engine 530 to assign resources locally via APIs of OpenStack 570. If an autonomous resource discovery, management, and stitching system 510 receives any incoming messages and its block has available resources, resource assignment engine 530 can be used to assign resources for this request. A reply can also be sent back to the block requesting the resource. Fresh assigned resources can associate with timeout values for the purpose of determining if they are used or not actually.

In embodiments of the present invention, resource monitoring engine 540 involves monitoring available resources and assigned resources in a local block. Information of available resources can be used by resource discovery engine 520. Information of assigned resources can be used for determining if the resources are used actually or not. If they are not used and keep idling beyond the timeout value, autonomous resource discovery, management, and stitching system 510 can call resource teardown 560 to release resources.

Resource stitching engine 550 can be used for networking stitching between resources assigned across multiple blocks. Once a block assigns resource for a request received from other block, it will reply that particular block, including the stitching information, e.g. virtual extensible local area network identifier (VxLAN ID). After the requesting block receives the reply, it can assign any necessary resources according to the stitching information. After stitching, seamless resource access and control can be achieved. In embodiments of the present invention, to any requesting block, the resources assigned from other blocks perform as if they are local resources. A main difference between a local resource and a remote resource (on a different block) is that the local OpenStack controller does not have the ability to directly manage remote resources.

If there is any incoming request to release assigned resources, autonomous resource discovery, management, and stitching system 510 calls resource teardown engine 560. If all resources only reside at the local block, teardown is direct. If there exists any remote assigned resources, a teardown message including the resource information can be sent out towards the remote block. Once the remote block(s) receive the teardown request, the corresponding resources can be deleted and released. In embodiments of the present invention, a block assigns resources for an incoming request. However, the resources keep idling beyond the timeout checking by resource monitoring engine. In embodiments of the present invention, autonomous resource discovery, management, and stitching system 510 determines the assigned resources are not used by the requesting block, thus it can call resource teardown engine 560 to release the resources.

Figure 6:
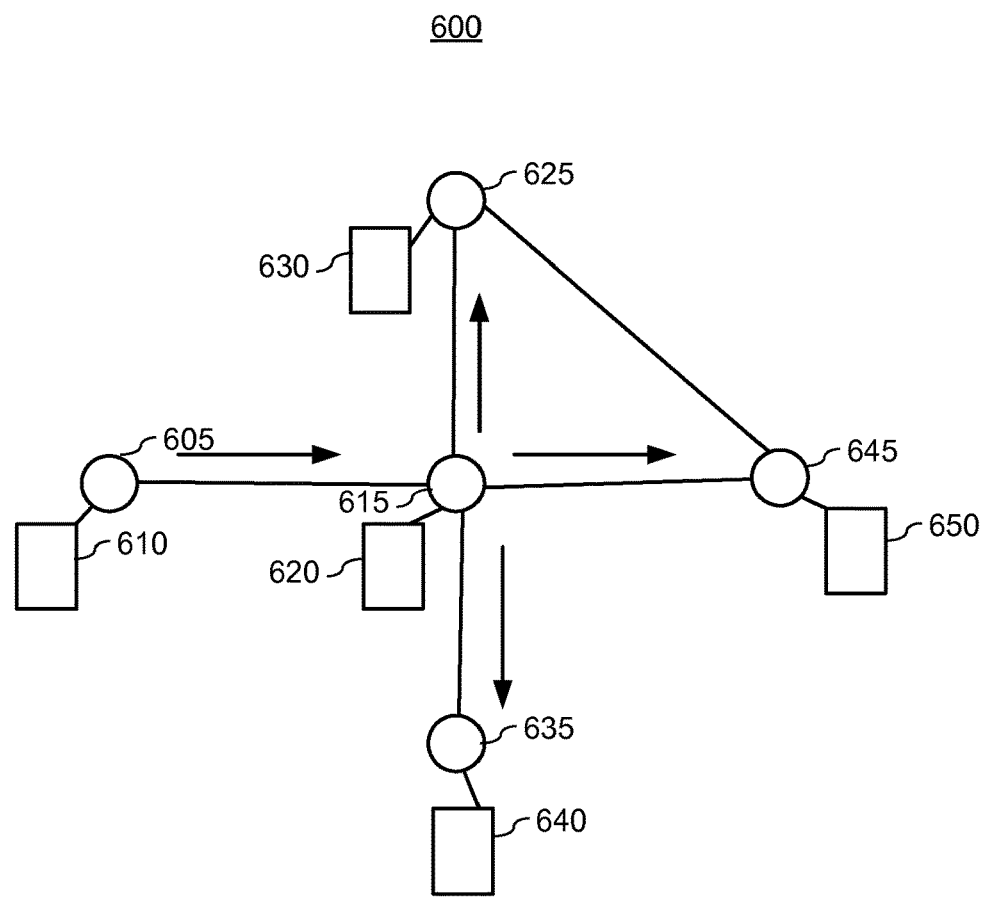
FIG. 6 depicts a block diagram of a block architecture according to embodiments of the present invention.

FIG. 6 depicts a block diagram of a block architecture according to embodiments of the present invention. FIG. 6 depicts a plurality of blocks each including an autonomous resource discovery, management, and stitching system and at least one infrastructure. FIG. 6 shows autonomous resource discovery, management, and stitching system 605 and rack 610, autonomous resource discovery, management, and stitching system 615 and infrastructure 620, autonomous resource discovery, management, and stitching system 625 and infrastructure 630, autonomous resource discovery, management, and stitching system 635 and infrastructure 640, and autonomous resource discovery, management, and stitching system 645 and infrastructure 650. Although FIG. 6 is depicted with only one infrastructure per autonomous resource discovery, management, and stitching system, that is for ease of explanation and not intending to limit the present invention to one infrastructure. To the contrary, in typical embodiments more than one infrastructure would be managed by each autonomous resource discovery, management, and stitching system.

In FIG. 6 autonomous resource discovery, management, and stitching system 605 can be considered the requesting block. Should there be a request for resources within that block, autonomous resource discovery, management, and stitching system 605 would look to see if that request can be fulfilled within the block. If the request cannot be fulfilled within the block, then autonomous resource discovery, management, and stitching system 605, can send a request to adjacent block or blocks. In the example shown in FIG. 6 the request would be sent to autonomous resource discovery, management, and stitching system 615. Autonomous resource discovery, management, and stitching system 615 can evaluate whether it can fulfill the request within its block. If it can, then it can send back a message to the requesting autonomous resource discovery, management, and stitching system 605. If it cannot fulfill the request, then it can forward the request to its adjacent blocks. In the example shown in FIG. 6, its adjacent blocks are autonomous resource discovery, management, and stitching system 625, autonomous resource discovery, management, and stitching system 635, and autonomous resource discovery, management, and stitching system 645. Again, each of those autonomous resource discovery, management, and stitching systems 625, 635, and 645 evaluate whether they can fulfill the request. The autonomous resource discovery, management, and stitching systems that can fulfill the request send a message back to autonomous resource discovery, management, and stitching system 615 to forward back to requesting autonomous resource discovery, management, and stitching system 605. If more than one autonomous resource discovery, management, and stitching system 625, 635, and 645 can fulfill the request, then one of the autonomous resource discovery, management, and stitching systems 625, 635, or 645 can be selected by requesting autonomous resource discovery, management, and stitching system 605. Once a resource is found, it can be assigned, stitched, and torn down as described above with reference to FIG. 5.

Using autonomous resource discovery, management, and stitching system, resources can be described in java script object notation (JSON) format. One of skill in the art will recognize that other formats can used as well. In embodiments of the present invent the following fields can be used:
1. Computing, for example central processing unit or core specifications
2. Memory, for example random access memory (RAM) specifications
3. Storage, for example disk space or access time specifications
4. Networking, for example bandwidth, latency, or packet loss tolerance specifications
5. Network services, for example service type (monitoring, packet capturing, etc) or binaries In some embodiments resource specification (RSPEC) can be used by autonomous management system to specify the resource requested.

Figure 7:
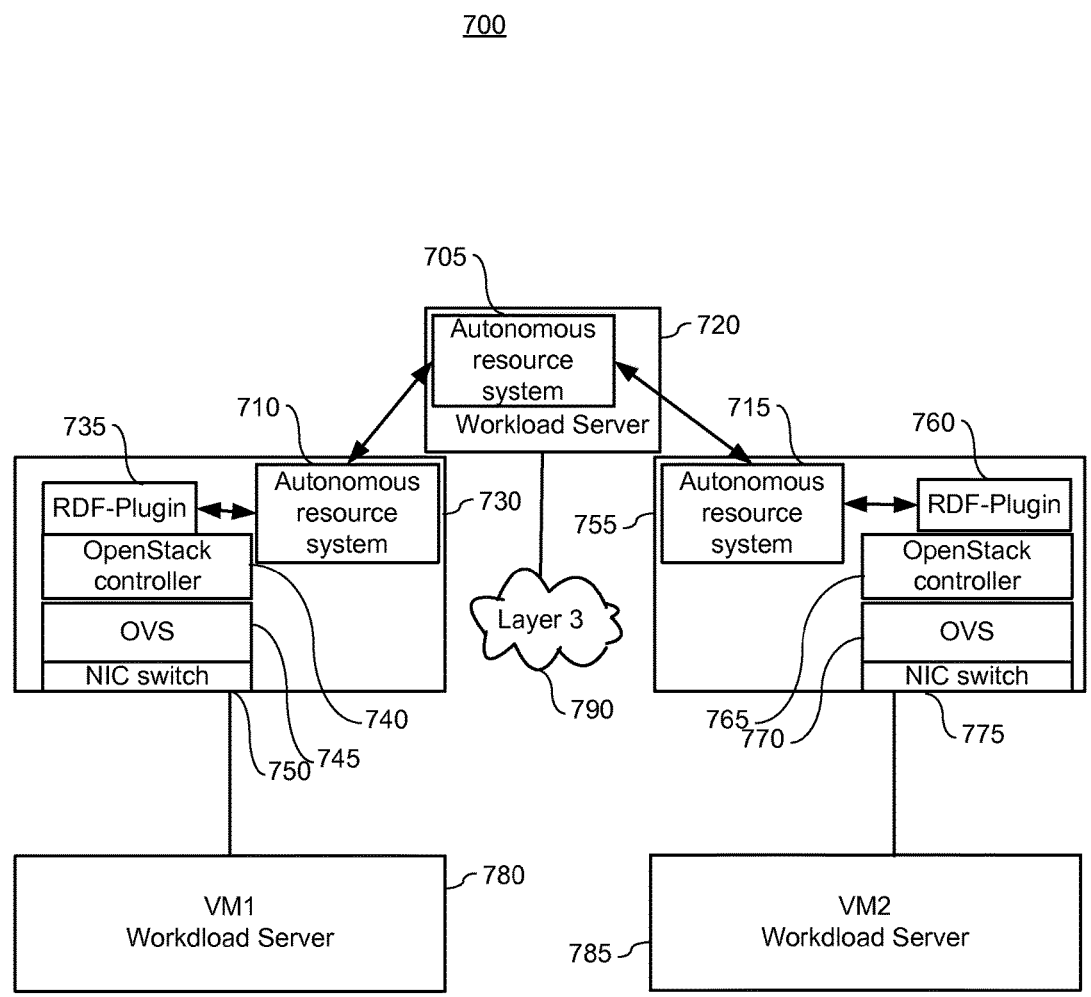
FIG. 7 depicts another block diagram of a block architecture according to embodiments of the present invention.

FIG. 7 depicts another block diagram of a block architecture according to embodiments of the present invention. FIG. 7 shows an example of an autonomous management system using three blocks. One block includes switch 730, including autonomous resource system 710 and workload server including RDF plugin 735, OpenStack controller 740, OVS 745, and NIC switch 750 and workload server 780. Autonomous resource system is intended to have the same meaning as autonomous resource discovery, management, and stitching system. FIG. 7 shows an example of an autonomous resource discovery, management, and stitching system using three blocks. One block includes switch 730, including autonomous resource system 710 and workload server including RDF plugin 735, OpenStack controller 740, OVS 745, and NIC switch 750 and workload server 780. Another block includes switch including autonomous resource system 715 and workload server including resource description framework (RDF) plugin 760, OpenStack controller 765, OVS 770, and NIC switch 775 and workload server 785. The third block includes workload server 720 including autonomous resource system 705 and layer 3 790.

In the example shown in FIG. 7 the block including workload server 720 and layer 3 790, that block is not itself connected to any resources. That block acts as a relay agent and does not federate any OpenStack controller.

An example of resource request flow in FIG. 7 is described below. The example is merely illustrator and not intended to be limiting in any way. A request from a user or application within the block comprised of switch 730 and workload server 780 is made for two virtual machines (VM's). Autonomous resource system 710 can search for the resource within the block. There is only a resource for one VM, but not the second VM. Therefore, autonomous resource system 710 can send a request on to the next hop, in the case of FIG. 7 to adjacent autonomous resource 705. Autonomous resource system 705 can search within its local block for the resource. It does not have the resource of one VM, so it can forward the request to its adjacent autonomous resource system 715. Autonomous resource system 715 does have the resource of one VM. Autonomous resource system 715 can send a response back to autonomous resource system 710 via autonomous resource system 710 with the information of assigned resources including the VxLAN ID. Autonomous resource system 710 can call resource assignment engine to create one VM and configure the tunneling endpoint at server switch 755. Once server switch 730 gets this reply and knows the assigned resource information, it can go ahead with assigning one VM and configuring the tunneling endpoint in its block. Finally, VM1 780 and VM2 785 are connecting with each other via VxLAN and look like in the same LAN to autonomous resource system 710. However, autonomous resource system 710 manages only workload server 780 and autonomous resource system 715 manages only workload server 785.

Figure 8:
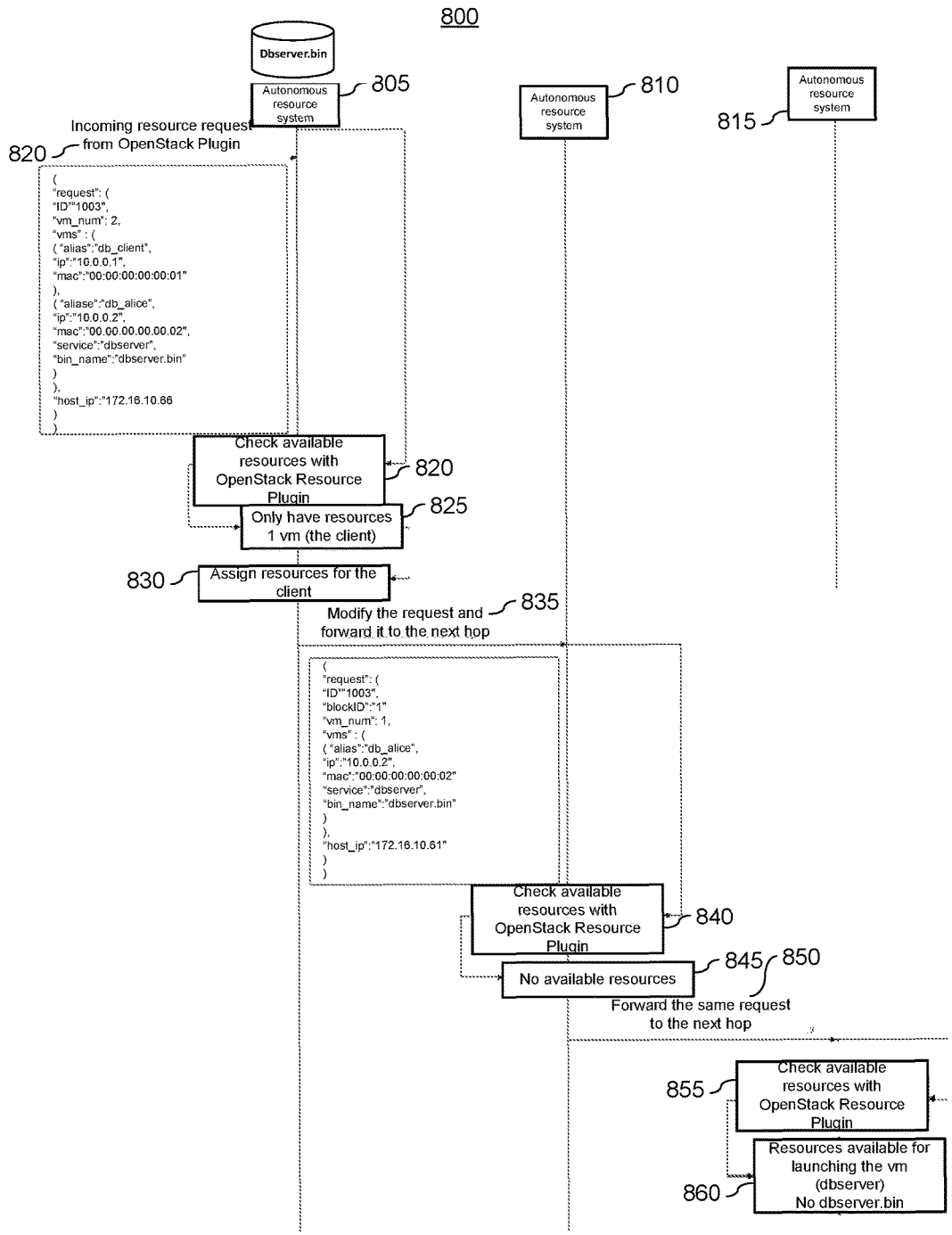
FIG. 8 depicts a flow chart of autonomous resource discovery, management, and stitching according to embodiments of the present invention.

FIG. 8 depicts a flow chart of autonomous resource discovery, management, and stitching according to embodiments of the present invention. FIG. 8 shows the messaging sequence including an entire procedure from resource requesting and discovery to resource teardown and release. In FIG. 8, a linear topology of three blocks is assumed (similar as FIG. 7) and the binary dbserver.bin is assumed to be stored only in the block including switch 730 and workload server 780 at the beginning. One of skill in the art will appreciate that this flowchart explains a typical example, which can be extended to advanced applications or services in practice.

In FIG. 8 an incoming resource request from an OpenStack plugin 820 is received by autonomous resource system 805. Autonomous resource system 805 checks available resources with OpenStack resource plugin 820. In the example described in FIG. 7, autonomous resource system 805 only has one VM resource 825. Autonomous resource system 805 assigns resources for the client 830. Autonomous resource system 805 modifies the request and forwards it to the next hop 835. Autonomous resource system 810 checks available resources with OpenStack resource plugin 840. Autonomous resource system 810 determines no available resources 845. Autonomous resource system 810 forwards the same request to the next hop 850. Autonomous resource system 815 receives the request and checks available resources with Openstack resource plugin 855. Autonomous resource system 815 determines that the resource is available 860.

Figure 9:
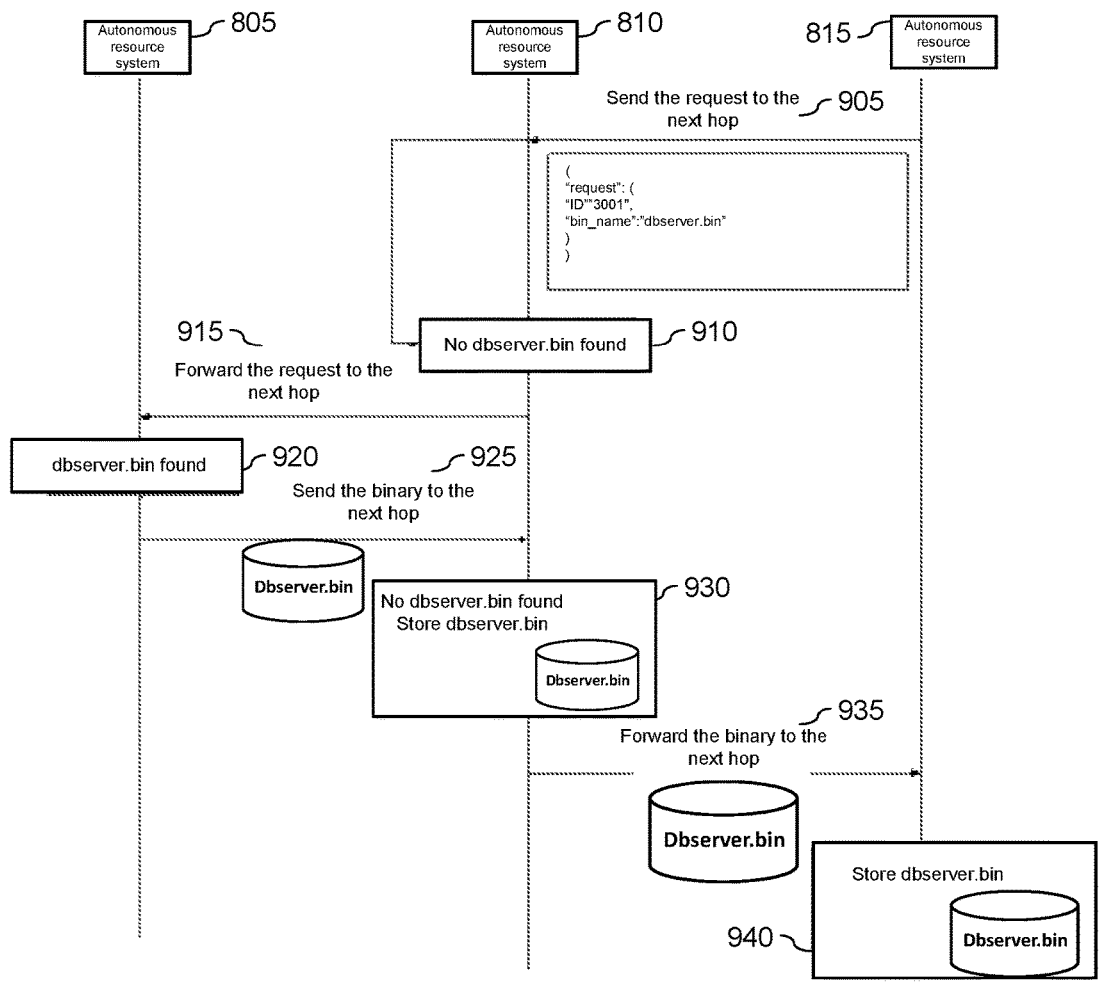
FIG. 9 depicts a flow chart of image retrieval according to embodiments of the present invention.

FIG. 9 depicts a flow chart 900 of binary retrieval according to embodiments of the present invention. FIG. 9 shows flow continuing the example described in reference to FIG. 7. Autonomous resource system 815 sends the request to the next hop 905. Autonomous resource system 810 finds no dberver.bin found 910. Autonomous resource system 810 forwards the request to the next hop 915. Autonomous resource system 805 finds dberver.bin 920. Autonomous resource system 805 sends the binary to the next hop 925. Autonomous resource system 810 finds no dbserver.bin and stores dbserver.bin 930. Autonomous resource system 810 forwards the binary to the next hop 935. Autonomous resource system 815 stores the dbserver.bin 940.

Figure 10:
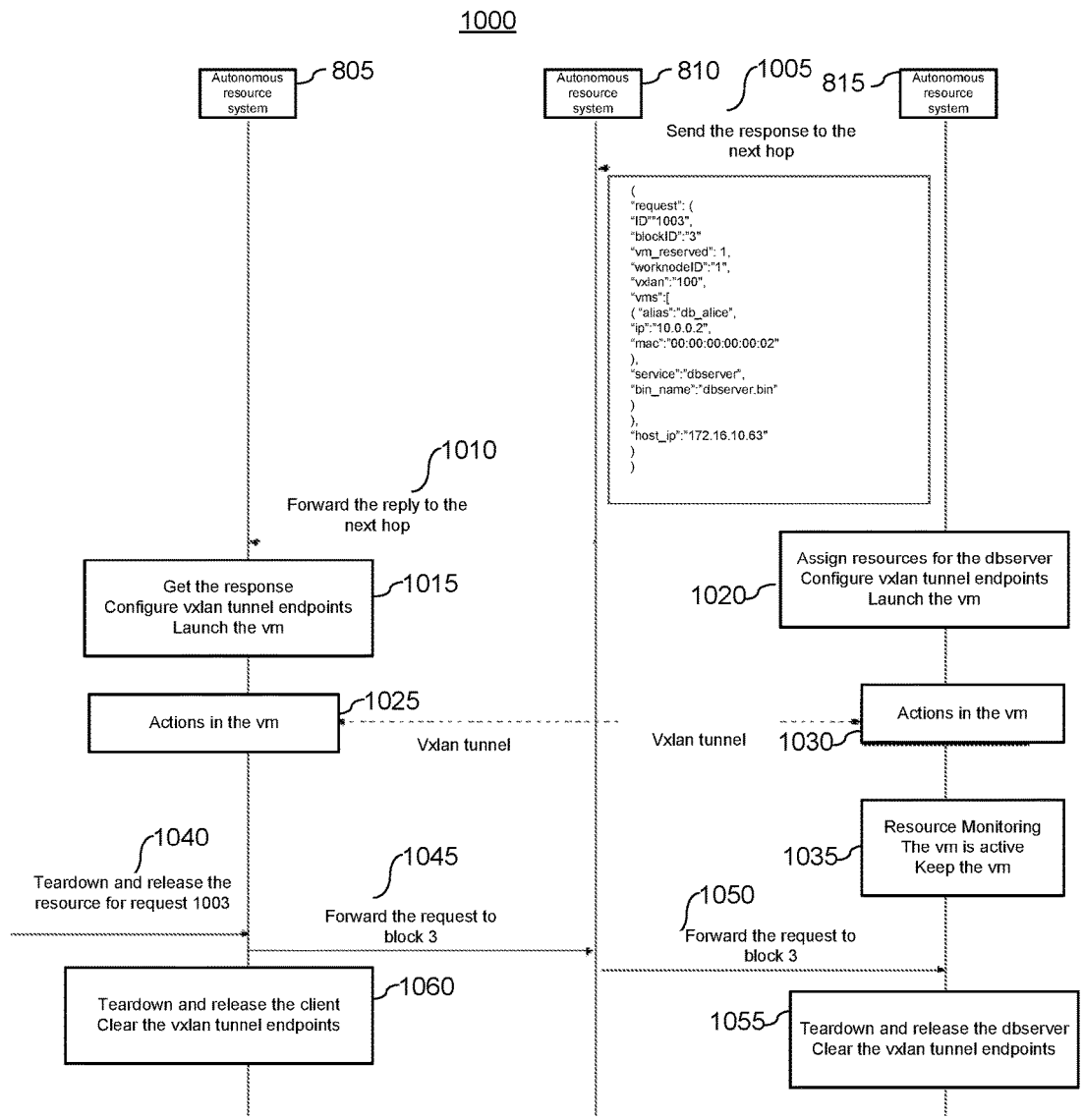
FIG. 10 depicts a flow chart of autonomous resource discovery, assignment, stitching, monitoring, and teardown according to embodiments of the present invention.

FIG. 10 depicts a flow chart of autonomous resource discovery, assignment, stitching, monitoring, and teardown according to embodiments of the present invention. FIG. 10 also continues with the example described in reference to FIG. 7. Autonomous resource system 815 sends the response to the next hop 1005. Autonomous resource system 810 forwards the reply to the next hop 1010. Autonomous resource system 805 receives the response, configures the VXLAN tunnel endpoints, and launches the VM 1015. Autonomous resource system 805 actions in the VM 1025 and establishes a VXLAN tunnel with the VM managed by autonomous resource system 815 1030. After the resource use has ended autonomous resource system 805 tears down and releases the resources for the request 1040. Autonomous resources system 805 forwards the request 1045 to autonomous resource system 810. Autonomous resource system 810 forwards the request 1050 to autonomous resource system 815. Autonomous resource systems 805 and 815 teardown and release the client and clear the VXLAN tunnel endpoints 1055 and 1060.

One of skill in the art will appreciate that the example described in reference to FIG. 7 and used in FIGS. 8, 9, and 10 is illustrative only and not intended to be limiting. One of skill in the art will also appreciate that the flowcharts of FIGS. 8, 9, and 10 can apply to other examples as well.

Figure 11:
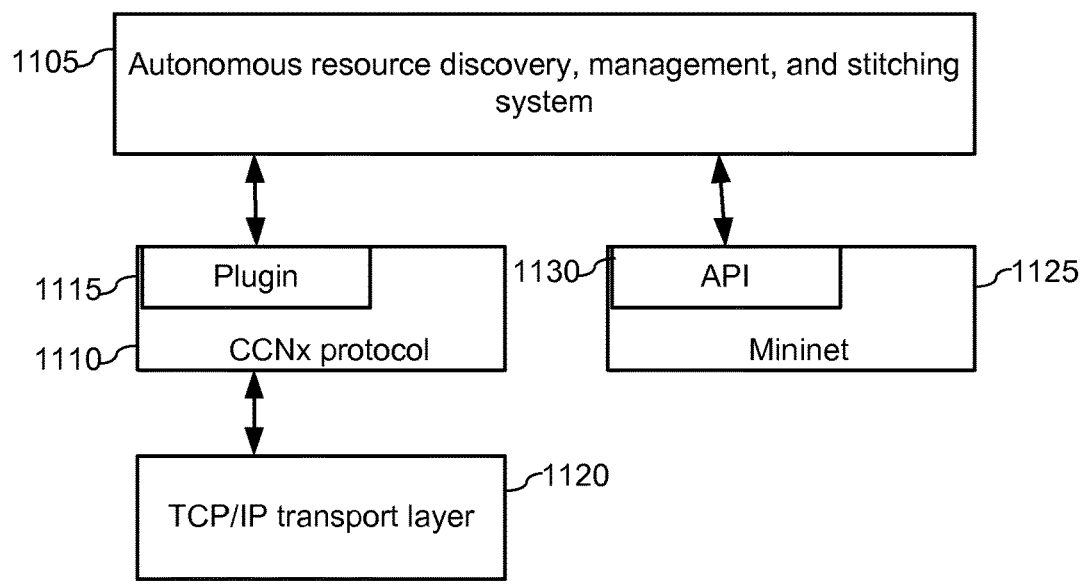
FIG. 11 depicts an implementation of a block architecture according to embodiments of the present invention.

FIG. 11 depicts an implementation of a block architecture according to embodiments of the present invention. In one embodiment of an implementation of the present invention is shown in FIG. 11.

Autonomous resource discovery, management, and stitching system can be implemented under Ubuntu 14.04. In some embodiments of the present invention, autonomous resource discovery, management, and stitching system can be built on top of content-centric networking (CCNx) protocol. CCNx is a potential protocol of content-centric networking. The version 0.8.2 of CCNx protocol can be used and tested. Although CCN is clean-slate architecture of Future Internet, it can co-exist with TCP/IP in the real world. In the implementation shown in FIG. 11, CCNx is used as an overlay networking protocol on top of transmission control protocol/internet protocol (TCP/IP) transport layer. Internet protocol (IP) addresses and user datagram protocol (UDP) socket can be used for phase configuration in CCNx. The autonomous resource discovery, management, and stitching system can send out messages in the format of CCNx Interest packets and reply messages in the format of CCNx Content packets.

In FIG. 11, instead of directly using cloud infrastructure using OpenStack on multiple physical servers, the networking emulation tool Mininet can be used and tested first for simplicity. Mininet uses open virtual switch (OVS) as a fundamental component to create ports, performing as virtual hosts attached. Thus, in this embodiment, one server or one VM installed Ubuntu could be considered as a block. Once the autonomous resource discovery, management, and stitching system decides to assign resources, it can take actions via Mininet APIs.

One advantage of the present invention is that it provides a distributed, scalable, autonomous resource discovery, management, and stitching system that is capable of near infinite scalability.

Another advantage of the present invention is that the management process is simplified and more reliable since one central management system is not managing a large number of racks.

Yet another advantage of the present invention is that it addresses the problem of scalability in cloud environments.

One of ordinary skill in the art will appreciate that various benefits are available as a result of the present invention.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. A block system, comprising:
   at least one local infrastructure; and
   a local autonomous resource system executing on a processor enabling the processor to manage resources on the at least one local infrastructure, the local autonomous resource system comprising:
      a resource discovery engine executing on the processor enabling the processor to search within the at least one local infrastructure responsive to a request for a resource and to send a request to at least one remote autonomous resource system for discovery of the resource;
      a resource assignment engine, operating in conjunction with the resource discovery engine, executing on the processor enabling the processor to assign a discovered resource and to send a message to the remote autonomous resource system responsive to a request from the remote autonomous resource system; and
      a resource stitching engine executing on the processor enabling the processor to stitch a network path to the resource assigned from the remote autonomous resource system.

2. The system of claim 1 further comprising a resource monitoring engine executing on the processor enabling the processor to monitor resources on the local autonomous resource system and interface with the resource discovery engine.

3. The system of claim 1 further comprising a resource tear down engine executing on a processor enabling the processor to send a message to the remote autonomous resource system to release the resource.

4. The system of claim 1 wherein the resource is a storage request.

5. The system of claim 1 wherein the resource is a compute request.

6. The system of claim 1 wherein the processor is contained on a network switch.

7. A method for managing a resource in a distributed environment, comprising:
   sending a request to a local autonomous resource system on a local block for a resource;
   searching the local autonomous resource system for the resource;
   sending a request to a remote autonomous resource system for the resource;
   receiving a response from the remote autonomous resource system, the response providing an indication of whether the remote autonomous resource system has the resource;
   assigning a resource located on a remote block; and
   stitching a network path to the resource assigned from a remote autonomous resource system.

8. The method of claim 7 further comprising monitoring the local block for resources.

9. The method of claim 7 further comprising releasing the resource responsive to a request to release a resource from the remote autonomous resource system.

10. The method of claim 7 wherein the resource is a compute request.

11. The method of claim 7 wherein the resource is a storage request.

12. The method of claim 7 further comprising sending a message to the remote autonomous resource system to release the resource.

13. The method of claim 7 further comprising forwarding a message to a remote autonomous resource system responsive to failing to have the resource on the local autonomous resource system.

14. A distributed, autonomous system, comprising:
   a plurality of autonomous blocks, each block comprising:
      a set of one or more resources; and
      an autonomous resource system, executing on at least one processor, enabling the at least one processor to manage at least some of the set of one or more resources, the autonomous resource system comprising:
         a resource discovery engine that, responsive to receiving a request for a resource, initially searches within its block to determine if the resource identified in the request is available, and responsive to a discovered resource being available within the block, notifies a resource assignment engine of the autonomous resource system to assign the discovered resource to satisfy the request; and
         responsive to insufficient resources being available within the block to satisfy the request, sends the request for the resource to at least one or more neighboring blocks to facilitate finding another block or blocks that can satisfied the request;
         the resource assignment engine, operating in conjunction with the resource discovery engine, that assigns the discovered resource to service the request; and
         a resource stitching engine that, responsive to the discovered resource being at another block and responsive to the block being the block that originated the request, stitches a network pathway to the discovered resource assigned to it by the another block.

15. The system of claim 14 further comprising a resource monitoring engine executing on at least one processor that monitors resources on the autonomous resource system and interfaces with the first resource discovery engine.

16. The system of claim 14 wherein the autonomous resource system is further configured to, responsive to the discovered resource being available within the block and responsive to the block not being the block that originated the request, send a reply message to the block that originated the request that it has the discovered resource to satisfy the request.

17. The system of claim 14 further comprising a resource tear-down engine executing on at least one processor enabling the autonomous resource system to have the discovered resource released.

18. The system of claim 14 wherein the autonomous resource system is further configured to, responsive to receiving a reply message from another block that has the discovered resource available to satisfy the request and responsive to the block not being the block that originated the request, forwards the reply message toward the block that originated the request.

* * * * *

UNITED STATES PATENT AND TRADEMARK OFFICE
CERTIFICATE OF CORRECTION

PATENT NO.       : 10,318,550 B2
APPLICATION NO.  : 14/808925
DATED            : June 11, 2019
INVENTOR(S)      : Rajesh Narayanan Page 1 of 1

It is certified that error appears in the above-identified patent and that said Letters Patent is hereby corrected as shown below:

In the Claims

At Column 12, Line 46, Claim 15, "--interfaces with the first resource discovery engine." should read "-- interfaces with the resource discovery engine."

Signed and Sealed this
First Day of October, 2019

Andrei Iancu
*Director of the United States Patent and Trademark Office*